United States Patent [19]

Abecassis

[11] Patent Number: 5,422,468
[45] Date of Patent: Jun. 6, 1995

[54] DEPOSIT AUTHORIZATION SYSTEM

[76] Inventor: Max Abecassis, 19020 NE. 20 Ave., Miami, Fla. 33179

[21] Appl. No.: 969,327

[22] Filed: Oct. 30, 1992

[51] Int. Cl.⁶ .................................................. G06K 5/00
[52] U.S. Cl. ................................. 235/380; 235/379; 235/381; 235/382; 235/383; 902/18
[58] Field of Search ............... 235/379, 380, 381, 382, 235/382.5, 383, 489; 902/4, 5, 18, 25, 26, 27, 31; 340/825.33, 825.34, 825.35; 283/57, 59, 60.1, 60.2

[56] References Cited

U.S. PATENT DOCUMENTS

| | | | |
|---|---|---|---|
| 910,070 | 1/1909 | Kent | 283/59 |
| 1,236,475 | 8/1917 | Peirce | 280/60.1 |
| 3,688,088 | 8/1972 | Brown et al. | 235/489 |
| 3,723,655 | 3/1973 | Zucker et al. | 379/91 |
| 3,851,580 | 12/1974 | Correii et al. | 101/45 |
| 4,105,156 | 8/1978 | Dethloff | 235/441 |
| 4,403,793 | 9/1983 | McCormick et al. | 283/105 |
| 4,472,626 | 9/1984 | Frid | 235/379 |
| 4,485,300 | 11/1984 | Peirce | 235/380 |
| 4,529,870 | 7/1985 | Chaum | 235/380 |
| 4,544,184 | 10/1985 | Freund et al. | 283/94 |
| 4,550,246 | 10/1985 | Markman | 235/383 |
| 4,643,453 | 2/1987 | Shapiro et al. | 283/73 |
| 4,700,055 | 10/1987 | Kashkashian, Jr. | 235/379 |
| 4,707,592 | 11/1987 | Ware | 235/280 |
| 4,723,794 | 2/1988 | Shannon | 283/60.1 |
| 4,729,128 | 3/1988 | Grimes et al. | 382/58 |
| 4,745,267 | 5/1988 | Davis et al. | 235/379 |
| 4,768,811 | 9/1988 | Oshikoshi et al. | 283/82 |
| 4,805,722 | 2/1989 | Keating et al. | 180/287 |
| 4,825,050 | 4/1989 | Griffith et al. | 235/379 |
| 4,862,501 | 8/1989 | Kamitake et al. | 380/50 |
| 4,903,989 | 2/1990 | McCormick | 462/69 |
| 4,939,584 | 7/1990 | Sakakibara et al. | 358/296 |
| 4,947,027 | 8/1990 | Golightly | 235/448 |
| 4,959,788 | 9/1990 | Nagata et al. | 235/380 |
| 4,980,680 | 12/1990 | Knoll et al. | 340/825.31 |
| 5,088,962 | 2/1992 | McCartney | 462/18 |
| 5,265,008 | 11/1993 | Benton et al. | 283/57 X |
| 5,302,811 | 4/1994 | Fukatsu | 235/381 |
| 5,315,511 | 5/1994 | Matsuura et al. | 235/379 X |

FOREIGN PATENT DOCUMENTS

| | | | |
|---|---|---|---|
| 0250464 | 12/1985 | Japan | 235/382.5 |
| 0297297 | 12/1990 | Japan | 235/382 |

*Primary Examiner*—Donald Hajec
*Assistant Examiner*—Esther H. Chin

[57] ABSTRACT

This invention relates to an enhanced transaction approval system for processing transactions in which a deposit is tendered for the purchase of goods and services. Specifically, the credit authorization system for a deposit transaction permits the exclusion of card information on the purchase deposit slip, provides for the inclusion of a delivery by date on the purchase deposit slip, and utilizes a transaction number that both identifies the deposit transaction and represents an approval number.

21 Claims, 12 Drawing Sheets

```
                                  ┌─ 1100
        ┌─────────────────────────────┐
        │      123456789012345        │
        │                             │
        │        SELLER'S NAME        │
        │       STREET ADDRESS        │
        │        CITY ST  12345       │
        │         305-932-1257        │
        │                             │
        │   REP        : 1234  Clark K. │
        │                             │
        │   DATE       : 07/29/92     │
        │   TIME       : 15:31        │
1101 ───┼──  DEPOSIT TRANSACTION      │
        │                             │
1102 ───┼── DEPOSIT NO. : 12345678901234567
1104 ───┼── TR TYPE     : CHRG VISA   │
        │                             │
1103 ───┼── DELIVERY BY : 08/21/92    │
        │   AMOUNT      : $500.00     │
        │                             │
        │   X─────────────────────    │
        │   I AGREE TO PAY ABOVE TOTAL AMOUNT
        │   ACCORDING TO CARD ISSUER AGREEMENT
        │                             │
        │   TOP COPY-MERCHANT         │
        │   BOTTOM COPY-CUSTOMER      │
        └─────────────────────────────┘
```

```
                    ┌─300                              ┌─400

1234526789012345678              1234526789012345678
                BATCH: 123                       BATCH: 123

S-A-L-E-S  D-R-A-F-T             S-A-L-E-S  D-R-A-F-T

SELLER'S NAME                    SELLER'S NAME
              STREET ADDRESS                   STREET ADDRESS
              CITY ST  12345                   CITY ST  12345
               305-932-0169                    305-932-0169

CLERK: 1234                      CLERK: 1234

DATE:05/20/91                   DATE:05/20/91
          TIME:15:31                      TIME:15:31
  301 ──── ACCT: 1234567890123456
  302 ──── EXP : 0793
          CD TYPE: VISA             402 ──── CD TYPE: VISA
          TR TYPE: PR               403 ──── TR TYPE: PR
  303 ──── AP CODE:123456            401 ──── TR NO.  : 12345678901234567
  304 ──── REF NO. :3824

AMOUNT:$500.00             404 ──── AMOUNT:$500.00

X─────────────             405 ──── X─────────────
          I AGREE TO PAY ABOVE TOTAL AMOUNT    I AGREE TO PAY ABOVE TOTAL AMOUNT
          ACCORDING TO CARD ISSUER AGREEMENT   ACCORDING TO CARD ISSUER AGREEMENT

TOP COPY-MERCHANT                    TOP COPY-MERCHANT
          BOTTOM COPY-CUSTOMER                 BOTTOM COPY-CUSTOMER
```

PRIOR ART

FIG. 3          FIG. 4

```
                    500                                    600
           SELLER'S NAME  VISA ── 506              SELLER'S NAME
           STREET ADDRESS                          STREET ADDRESS
           CITY ST  12345                          CITY ST  12345
           305-932-0169                            305-932-0169

STATION # 3                             STATION # 3

SAT, SEP 28, 1991 08=11 PM             SAT, SEP 28, 1991 08=11 PM

CREDIT CARD                    603 ──── VISA CREDIT CARD
501 ── ACCT NO:     1234567890123456       601 ── TR NO:     12345678901234567
502 ── EXP DATE:    9307                          TR TYPE:   PURCHASE
       TR TYPE:     PURCHASE                      AMOUNT:    $68.43
       AMOUNT:      $68.43                 602 ── SERVER:    51     BETSY
503 ── APP CODE:    845906
504 ── REC NO:      024                           SUB TOTAL =  $ 68.43

505 ── SERVER NO:   51                            TIP =        $_____
507 ── TICKET NUMBER: 000000
       SUB TOTAL =  $ 68.43                       TOTAL =      $_____

TIP =        $_____                         THANK YOU

TOTAL =      $_____                   SIGN─────────────────────
                                               I AGREE TO PAY ABOVE TOTAL AMOUNT
                                               ACCORDING TO CARD ISSUER AGREEMENT
       SIGN─────────────────────
              THANK YOU                        TOP COPY-MERCHANT
                                               BOTTOM COPY-CUSTOMER

PRIOR ART

FIG. 5                                 FIG. 6
```

CHARGE SALE — 700

STORE LOGO

SELLER'S NAME 0216
12345 STREET ADDRESS (305) 932-1257
MIAMI, FL 33179

SALE      123 12345 12345
0216 05/20/91    11:36 PM

VISA/MC     $5.77

701 — ACCOUNT #    1234567890123456
702 — AUTHORIZATION #    123456/123456   TA
703 — EXPIRATION DATE    01//93

704 — 1234567

Cardholder acknowledges receipt of goods and/or services in the amount of the Total shown hereon and agrees to perform the obligations set forth in the Cardholder's agreement with the issuer.

CUSTOMER SIGNATURE
X

IMPORTANT: RETAIN THIS COPY FOR YOUR RECORDS
CUSTOMER COPY

CHARGE SALE — 800

STORE LOGO

SELLER'S NAME 0216
12345 STREET ADDRESS (305) 932-1257
MIAMI, FL 33179

SALE      123 12345 12345
0216 05/20/91    11:36 PM

VISA/MC     $5.77

801 — TRANSACTION #    1234567890123456

Cardholder acknowledges receipt of goods and/or services in the amount of the Total shown hereon and agrees to perform the obligations set forth in the Cardholder's agreement with the issuer.

CUSTOMER SIGNATURE
X

IMPORTANT: RETAIN THIS COPY FOR YOUR RECORDS
CUSTOMER COPY

SELLER'S NAME
                  STREET ADDRESS
                  CITY ST  12345
                   305-932-1257

REP         : 1234   Clark K.

DATE        : 07/29/92
          TIME        : 15:31

1101 ──── DEPOSIT TRANSACTION
1102 ──── DEPOSIT NO. : 12345678901234567
1104 ──── TR TYPE     : CHRG VISA

1103 ──── DELIVERY BY : 08/21/92
          AMOUNT      : $500.00

X------------------------------

I AGREE TO PAY ABOVE TOTAL AMOUNT
          ACCORDING TO CARD ISSUER AGREEMENT

TOP COPY-MERCHANT
          BOTTOM COPY-CUSTOMER
```

FIG. 11

1201 — DEPOSIT TRANSACTION — 1200

STORE LOGO

SELLER'S NAME 0216
12345 STREET ADDRESS (305) 932-1257
MIAMI, FL 33179

SALE          123  12345 12345
    0216 07/29/91     11:36 AM

VISA/MC          $2500.00

1202 — TRANSACTION #    1234567890123456
1203 — DELIVERY BY      08/23/92

1204 — Cardholder acknowledges the Deposit in the amount of the Total shown hereon and agrees to perform the obligations set forth in the Cardholder's agreement with the issuer.

CUSTOMER SIGNATURE
X

IMPORTANT: RETAIN THIS COPY FOR YOUR RECORDS
CUSTOMER COPY

FIG. 12

DEPOSIT TRANSACTION — 1301
1300

| Description | Quan. | Price | Extens. |
|---|---|---|---|
|  |  |  |  |
|  |  |  |  |
|  |  |  |  |
|  |  |  |  |

| Date | Contract # | Sub T | |
| | | Misc | |
| Transaction # | Delivery By | Tax | |
| | | Total | |
| Check # | DEPOSIT | | |

Slip #1234567890 CUSTOMER COPY

Purchaser sign here
X _____
Cardholder acknowledges the Deposit in the amount shown hereon and agrees to the terms of the Cardholder's agreement.

IMPORTANT: RETAIN THIS COPY FOR YOUR RECORDS 1302  1304  1303  1305  1306

FIG. 13

```
                    ┌─ 1400
                SELLER'S NAME
1411 ─────      STREET ADDRESS
                 CITY ST  12345
1412 ─────     1234526789012345678
                    BATCH: 123
1413 ──┬ CLERK  : 1234
       │ DATE   : 05/20/91
1414 ──┴ TIME   : 15:31
1415 ──┬ CD TYPE : VISA
       └ TR TYPE : PR
1416 ─── TR NO.  : 12345678901234567
1417 ─── AMOUNT : $500.00

1418 ─── X─────────────────────────
         I AGREE TO PAY ABOVE TOTAL AMOUNT
         ACCORDING TO CARD ISSUER AGREEMENT
                                      ┌─ 1401
               SECTION ABOVE-MERCHANT ─┘
         ooooooooooo ────────────────── 1403
               SECTION BELOW-CUSTOMER ─┐
                                       └─ 1402
                SELLER'S NAME
1421 ─────      STREET ADDRESS
                 CITY ST  12345
                  305-932-0169

1422 ──┬ DATE   : 05/20/91
       └ TIME   : 15:31
1423 ──┬ CD TYPE : VISA
       └ TR TYPE : PR
1424 ─── TR NO.  : 12345678901234567

1425 ─── AMOUNT : $500.00

1426 ─────────── THANK YOU
```

FIG. 14

DEPOSIT AUTHORIZATION SYSTEM

BACKGROUND OF THE INVENTION

1. Field of the Invention

This invention relates principally to an enhanced credit card authorization system, credit card formsets, credit card slips, and credit cards, which would be used in such a system.

2. Description of the Prior Art

Credit card systems suffer from a significant number of fraudulent credit card transactions, resulting from theft and/or forgery of credit cards, dishonest merchants, and dishonest individuals who have access to credit card information and resources. A significant number of contributions appear in the prior art that are directed at reducing the incidence of credit card fraud. A review of even a fraction of said art clearly reveals the effort that has been devoted to the problem. For example, U.S. Pat. No. 4,745,267, issued to Davis et al., commenting on a number of techniques and systems which have met with varying degrees of success, states that an effective technique which operates within the physical parameters of conventional credit cards has proven elusive. Testimony of the continued effort to effectively minimize fraud is evidenced by U.S. Pat. No. 4,700,055, issued to Kashkashian, Jr., and U.S. Pat. No. 4,947,027, issued to Golightly, which also list and review the contributions of a number of prior art patents.

Earlier manual credit card systems and the automated on-line credit authorization systems that have followed, show that following credit card verification, a paper record of the completed transaction is produced comprising credit card and/or authorized user identifying information, and relevant transaction data. An extensive amount of work has, and continues to be directed at reducing the opportunities for fraud that a record of this information creates.

U.S. Pat. No. 4,403,793, issued to McCormick et al., provides a credit card transaction slip formset that, when one of the slips is removed, the duplicating carbons are respectively split into two sections, each section containing a portion of the customer's account number. U.S. Pat. No. 5,088,962, issued to McCartney, reviews a number of prior art patents and indicates what it views as the shortcomings of each. McCartney shows a credit card transaction form set that provides detachment of all carbon sheets associated with the customer copy of the form, and can be detached from the customer copy of the form. The prior art known to applicant has failed to appreciate that form set enhancements cannot by themselves overcome the problems resulting from unauthorized access to discarded carbon papers, discarded customer slips, or merchant slips, containing a customer's credit card number, expiration date, and/or customer name.

Similarly, patents that concern themselves with enhancements to credit cards, as for example, U.S. Pat. No. 4,700,055, issued to Kashkashian, Jr., which interestingly enough, teaches combining a plurality of credit cards into a single card, the card not bearing any visually-perceptible identification of the name of the owner, or of the names of the credit card accounts represented on the card, also fail to address, much less suggest a means to eliminate disseminating identifying information in a credit card formset or invoice. While it may have been a requirement to imprint manually, and thereafter automatically, credit card information on a credit card slip, this need no longer be the case with modern on-line credit card authorization systems.

The previously referenced patent to Davis et al. suggests encoding the card blanks with account information and a verification code generated with an encoding algorithm to verify the validity of the card. While fraudulent duplication of the card is made more difficult, the card provides, in a known manner, the information required for duplication. U.S. Pat. No. 4,105,156, issued to Dethloff, teaches the inclusion of an integrated circuit on an identification card for storing a secret number, which a user must remember in order to verify that he is the authorized user of the card. U.S. Pat. No. 4,529,870, issued to Chaum discloses a card which has a microprocessor circuitry embedded within it. The circuitry generates a code which insures that only the true owner of the card can use it. The above referenced patent to Golightly, provides that when a credit card is presented to a merchant for use in a purchase, the merchant will request that the presenter identify a character from the supplemental set of characters embossed into the card to confirm the presenter's authority to use the card. U.S. Pat. No. 5,130,519, issued to Bush et al., details a chip card with an on-board keypad to provide validation of permitted use of said card through the use of a PIN code entered into a chip card by the cardholder at the time of the desired validation. None of these patents, or the prior art known to applicant, discloses an active card resident validation means that does not require a cardholder's action, and is in transparent integrated synchronized operation with an external credit authorization system.

SUMMARY OF THE INVENTION

These and other shortcomings of the prior art are overcome by the various features of the present invention which are directed to a credit authorization system. For purposes of the present invention, various terms or nomenclature used in the art will be defined as follows:

The term "credit card" as used herein is meant to include and be interchangeable with the words "debit cards", "deposit cards", "transaction cards", "identification cards", and any card, key, device, means, system, method, or architecture that provides identification and/or transaction privileges. Where a specific means is indicated it is for purposes of explanation and not limitation. The term "cardholder" is meant to include the person or identity assigned a "credit card" as herein defined.

The term "card number" or "credit card number" is the number associated with a "credit card's" privileges, and is distinguished here from the term "credit card account number" or "account number". "Account number" is defined herein as a general purpose identification number, such as may be required to obtain information, and provide services and privileges other than "credit card" privileges.

The terms "transaction slip", "credit card slip", "credit card voucher", "charge slip", "slip", "voucher", "invoice", or "receipt", are herein equivalent and interchangeable. Use of these terms generally include what is herein specifically defined as a "deposit slip". However, the term "deposit slip" is not generally meant to include other slips or vouchers. The term "formset" is defined herein as a set of "slips" combined for use in a single transaction. While the term "formset" is not interchangeable with the term "slip", when the term "slip" is used, it may, depending on the context, include a "formset".

The term "transaction record" refers to any means of storing transaction information whether as a hard copy document, such as for example a "transaction slip" or electronic means, such as for example a smart card. Use of the term "transaction slip" is intended to be understood in the broader sense of a "transaction record".

Accordingly it is an object of the present invention to provide an enhanced credit card authorization system comprising a transaction number generating and processing means.

It is another object of the present invention to limit the amount of information displayed in a credit card slip.

It is yet another object of the present invention to provide a single sheet multi-part continuous credit card slip providing multiple receipts of the transaction and eliminating the need for carbon or carbonless paper.

It is another object of the present invention to provide a credit card with non-volatile memory means for retaining card verification information in synchronization with an external credit authorization system.

Briefly these and other objects of the invention are accomplished by providing an enhanced credit card authorization system comprising: i) transaction number generating means; ii) storing the transaction number and transaction information required to complete processing, crediting, and debiting the appropriate accounts; and iii) utilizing the transaction number rather than a card number in the merchant's and customer's transaction record.

As indicated above, the credit card slips as per the present invention differ from the prior art, in the following fundamental manner: cardholder credit card information which in the existing art is universally shown in a credit card slip, such as credit card number, expiration date, and in some cases cardholder's name, are not shown in the credit card slips in a credit card formset of the present invention. Instead, this information is replaced by the corresponding transaction number. The transaction number in addition to uniquely identifying a credit card transaction, is as such an unique approval number, and therefore there is no need to show separate approval information.

Implicit in the objects of the present invention is incorporating the teachings of a transaction number on a deposit slip. Briefly, deposit slips are similar in construction to respective credit/debit vouchers; however, deposit slips uniformly incorporate the following inventive characteristics that distinguish them from the prior art: initially, the slips are clearly identified as being deposits signalling the underlying nature of the transaction; secondly, each deposit slip requires the entry of a delivery-by-date, this being an integral element in the processing of the deposit; thirdly, the deposit slip provides for payment by check, since a significant number of transactions will exceed any reasonable preestablished credit limit.

Proposed credit cards encoding schemes generally consist of an encoding architecture, which regardless of how esoteric the code combination may be, is nonetheless static, and therefore reproducible and predictable. Other encoding architecture involve the cardholder in an interactive manner. An element of the present invention is directed at a non-static non-interactive encoding architecture wherein the credit card code required to obtain credit authorization is continually altered with each satisfactory credit authorization event.

With these and other features, advantages and objects of the present invention, the manner of attaining the invention is apparent from the above teachings, and by reference to the following detailed description of the invention taken in conjunction with the accompanying drawings.

BRIEF DESCRIPTION OF THE DRAWINGS

FIGS. 3, 5, 7 and 9 are representations of prior art transaction slips, that serve to illustrate the implementation of a transaction number as per the present invention;

FIGS. 4, 6, 8 and 10 are representations of transaction slips according to the present invention.

FIGS. 11–13 are representations of transaction slips that serve to illustrate the implementation of a transaction number on deposit transactions as per the present invention;

FIG. 14 is a representation of a multi section transaction slip as per the present invention;

DESCRIPTION OF THE PREFERRED EMBODIMENT

Figure 1:
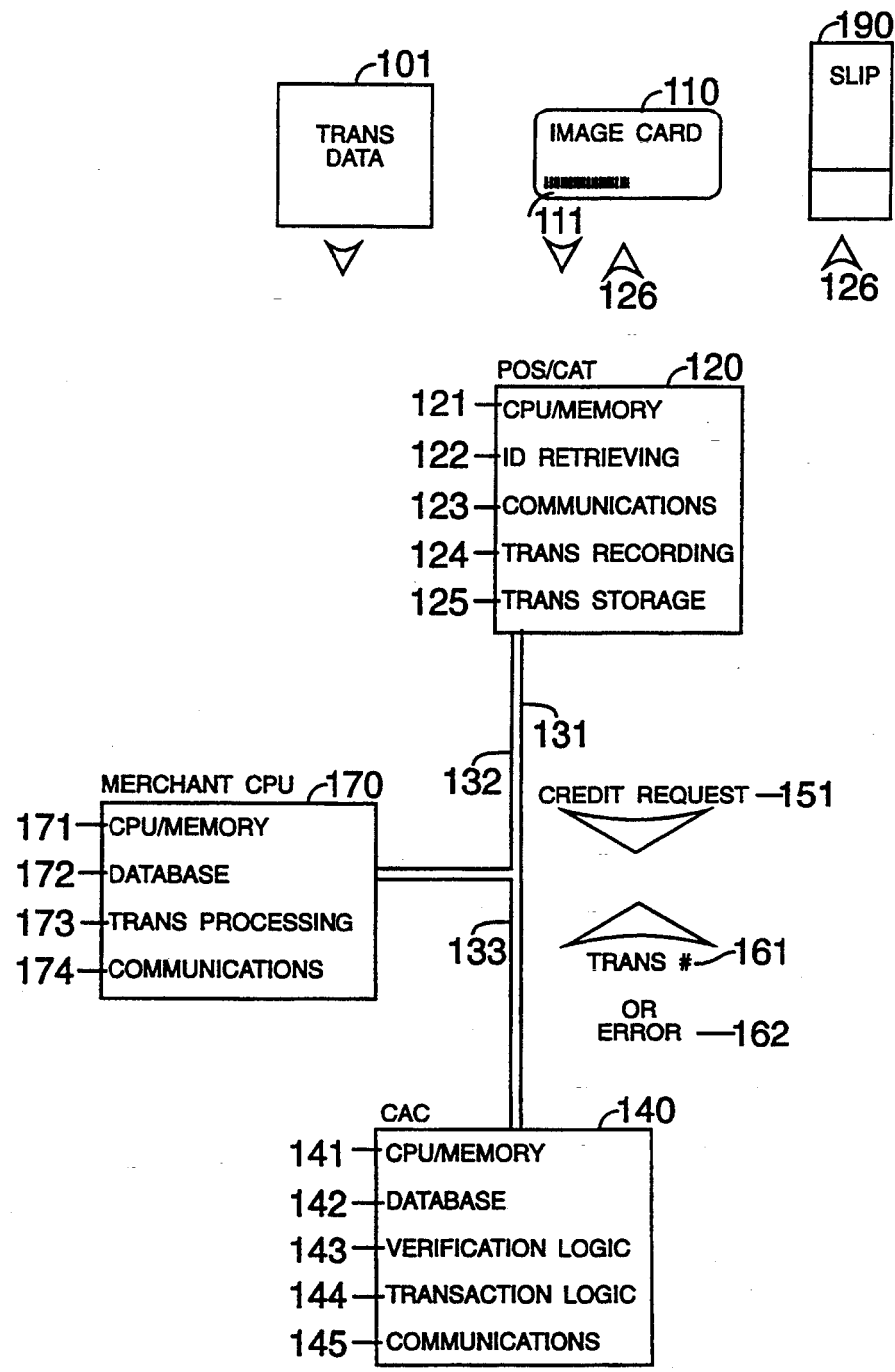
FIG. 1 is a block diagram of the architecture of the credit card authorization system as per the present invention.

Referring now in detail to the drawings wherein like parts are designated by like reference numerals, throughout, FIG. 1 is a block diagram of the architecture of an enhanced credit card authorization system as per the present invention. The authorization system provides credit authorization for a transaction to a customer identifying himself/herself at a credit authorization terminal ("CAT"). This identification may comprise an indirect means, as for example, a magnetic strip card, optical card, electronic card, or any other conventional or herein disclosed identification means. Alternatively, or in combination, identification means, may be directly received from the customer, as for example fingertip identification. All such identification means being represented in FIG. 1 as an image-card 110. This image card being described in detail further below.

A Point of Sale ("POS") CAT 120 generally comprises: i) CPU/memory means 121; ii) ID retrieving means 122; iii) line/off line communications means 123; iv) transaction record recording means 124; and v) transaction record storage means 125. The POS/CAT device 120, which may be transportable, as for example a portable computer/cellular modem device, is linked to the Credit Authorization Center ("CAC") 140 by line and/or non-line based communications means 131, may be similarly linked 132 to the merchants computing capabilities 170, and may be linked indirectly to the CAC 140 through the link 132 to the merchant's CPU, and the merchant's CPU link 133 to the CAC. In terms of the of the present invention, the principal elements of the CAC 140 comprise: i) CPU/memory means 141; ii) database means 142; iii) credit authorization and verification logic means 143; iv) transaction processing and logic means 144; and v) communications means 145. In terms of the present invention, the principal elements of the merchant computing capabilities 170 comprise: i) CPU/memory means 171; ii) database means 172; iii) transaction processing means 173; and iv) communication means 174.

To obtain credit authorization for a transaction 101, the customer provides required identification 110 to the POS/CAT device 120. The CAT captures the identifying information 111, and transmits same together with relevant transaction data 101 and merchant information, as in the conventional art, to the CAC, subject to the particular communications capabilities 123 of the CAT. The CAC 140 receives the credit authorization request 151 from the POS/CAT 120 by means of the CAC's communication means 145.

The computing facilities 141 of the CAC 140, comprising customer identification verification logic 143, and transaction verification logic 144, determines if credit authorization for the transaction is warranted. In order to approve the transaction, the information received 151 must pass verification tests which are customary in conventional automated credit authorization systems. If the transaction is in all respects acceptable, the CAC 140 interrogates the database's system information table 142 for a next transaction number 161, and updates the table. The transaction number 161 together with the respective transaction data, and any other relevant information which the CAC wishes to retain comprises a transaction record, which is written to the database 142. The unique key of said record being the newly obtained transaction number 161. The transaction number 161, which is also an approval number, is communicated by the CAC's to the CAT 120. If in any critical respects the transaction is not found acceptable, then an appropriate negative response 162 is transmitted by the CAC 140 to the CAT 120. This unacceptable transaction may be similarly written to the database.

Upon receipt of a transaction/approval number, the CAT transaction recording means 124 causes an appropriate record of the transaction to be produced 126, such as for example a transaction slip 190, or a transaction record provided to a customer device such as for example a laser read/write card 110. The distinguishing features of this transaction slip is that no information provided therein may reveal information which could provide access to credit card privileges. Excepting possibly the cardholder's signature, no other information regarding the cardholder is retained by the transaction record. It is explicitly stated, that in a preferred embodiment, the credit card does not provide the card number to the unaided eye, and in the case of a conventionally constructed transaction formset, the transaction slip does not provide it.

The interaction of the POS/CAT 120, and/or the CAC 140, in combination or individually with the merchant CPU 170 are not detailed here as they are analogous to conventional integrated architectures. It should be understood, however, that information may be transmitted by one source, for example the POS/CAT 120, simultaneously to a number of different recipients, for example the CAC 140 and the merchant CPU 170. This information need not be exactly the same for each recipient, but may be tailored as appropriate. Additionally, communications may be conducted embodying any suitable communications and data securing and encryption means, methods, systems, or architectures. In this regard, the teachings of such prior art such as U.S. Pat. No. 4,825,050, issued to Griffith et al. titled "Security Transaction System for financial Data" and the teachings of for example U.S. Pat. No. 4,862,501, issued to Kamitake et al. titled "Communications network Using IC Cards" are by reference incorporated herein.

Figure 2:
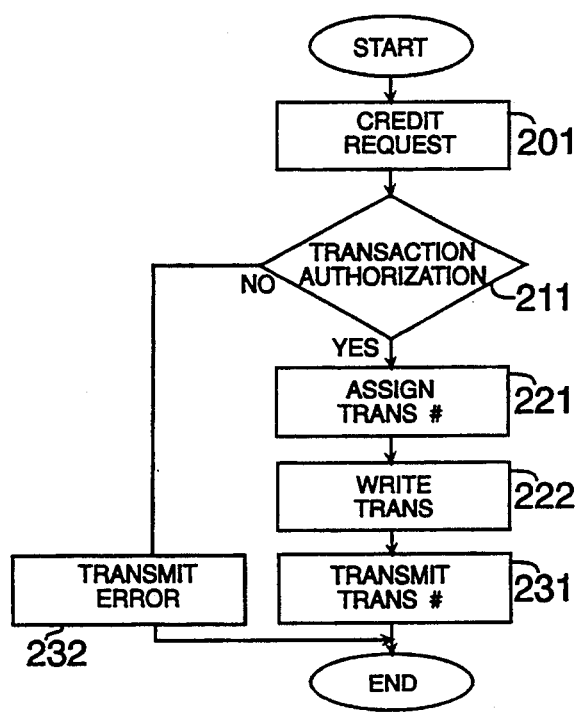
FIG. 2 is a flow chart operation of the credit card authorization system as detailed with respect to FIG. 1 as per the present invention.

FIG. 2 is a summary flow chart of the credit authorization center's card verification and transaction completion routines. The CAC receives a transaction credit authorization request 201 comprising card/cardholder identification, merchant identification, and transaction information. The CAC's computing capabilities, as detailed above, verify the received information with the corresponding database information 211. If the transaction is found acceptable, a transaction number is assigned 221. A transaction record is written into the database 222 of the CAC, and the transaction number is transmitted 231 to the CAT. If the transaction is not found acceptable 211, an appropriate error message is transmitted 232 to the CAT.

The flow chart of FIG. 2 may be further detailed to include, for example, specific error messages respective to the kind of transaction failure detected, whether a transaction exceeds the credit limit for the account, or the potential use of a fraudulent or stolen card. Additionally, and most importantly, it is to be understood, that specifically in connection with FIGS. 1, and 2, and generally throughout this detailed description, the preferred embodiment may detail combinations of elements which in certain situations may not be desirable to implement. For example, transaction slip enhancements detailed herein need not be implemented in combination with credit card enhancements. The software of conventional CAT based systems currently in use may be modified to produce a transaction slip as per the present invention without modifications to currently utilized credit cards or credit slip formsets. Since other possible implementation strategies, combinations, and exclusions, flow naturally from the present teachings and the teachings of the prior art, the various possible other permutations are not detailed herein.

FIGS. 4, 6, 8, and 10, are examples of the various credit card slips implementations of the transaction number as per the present invention, they are distinguished from their prior art counterpart, illustrated in FIGS. 3, 5, 7, and 9, respectively. Referring now specifically to each set of FIGS. attention is drawn to principal elements to further detail the present invention, those elements which are conventional in form and function and illustrated in the respective FIGS. need not be specifically described here. FIG. 3 is a representation of a prior art sales draft credit card slip 300 printed at a CAT station integrated with automated printing means. This sales draft is printed in a continuous paper, either as a single or multi-part continuous formset. In addition to other customary and merchant specific information printed, the cardholder's credit card number 301, expiration date 302, approval number 303, and a reference number 304 are included therein as in conventional practices. FIG. 4 is a representation of the sales draft credit card slip of FIG. 3 modified as per the teachings of the present invention. In the credit card sales draft 400 of FIG. 4, the cardholder's credit card number, expiration date, approval number, and reference number, have been replaced with a transaction number 401. It should be noted that while FIG. 4 includes other information such as for example credit type 402, and transaction type 403, these need not be included in the sales draft 400. Clearly as per the teachings detailed above all that is necessary to be included in the sales draft is the transaction number 401, the amount 404, and the cardholder's signature 405. All the other information consistent with the teachings herein that the merchant and/or processing center may wish to retain regarding the transaction may be retained in one or both of the respective databases.

FIG. 5 is a representation of a prior art credit card slip 500 printed at a CAT station integrated with an automated printing means. This credit card slip is an example of a format appropriate to a restaurant related transaction, the cardholder's credit card number 501, expiration date 502, approval number 503, and a reference number 504 are included therein as in conventional practices. FIG. 6 is a representation of the credit card slip of FIG. 5 modified as per the teachings of the present invention. In the credit card slip 600 of FIG. 6, the cardholder's credit card number, expiration date, approval number, and reference number, have been replaced with a transaction number 601.

It is generally noted, and specifically with respect to FIGS. 5 and 6, the information that may be printed in a slip may be configured and reconfigured by each merchant to fit the merchants specific requirements. For example where a merchant includes the server number 505 and wishes the customer to obtain the server's name, the server's name 602 may be also printed in the slip. Where the server may be required to handwrite the card's association code 506, it may be instead accomplished automatically 603. If an item such as for example the ticket number 507 is not being utilized it may be deleted. It is further noted that configurations capabilities may reside in the credit authorization center's hardware and software means, the CAT, or related integrated merchant hardware/software means.

FIG. 7 is a representation of a prior art credit card slip 700 in a pre-printed credit card multi-part formset. Upon a credit authorization inquiry, the formset is inserted in a printing device to record credit authorization information. The cardholder's credit card number 701, authorization number 702, and expiration date 703, are printed therein in a conventional manner. FIG. 8 is a representation of the credit card slip of FIG. 7 modified as per the teachings of the present invention. In the credit card slip 800 of FIG. 8, the cardholder's credit card number, approval number, and expiration date, have been replaced with a transaction number 801. Additionally the pre-printed formset number 704 shown in FIG. 7 is intentionally omitted in FIG. 8 as the merchant may in certain circumstances determine that the unique transaction number serves that function as well.

Figures 9, 10:

FIG. 9 is a representation of a prior art credit card slip 900 in a pre-printed credit card multi-part formset utilized in manually completed transactions. Usually following credit authorization approval, the formset is inserted in a stamping device, where the image of the embossed cardholder's credit card number 901, expiration date 902, and cardholder's name 903 are transferred to each of the slips in the formset. The store's identifying information 904 is either similarly previously stamped on the formset or pre-printed. In such forms a credit authorization number is handwritten 905. Additionally while a place is reserved for entering the cardholder's driver's license number 906, in practice this is seldom done. FIG. 10 is a representation of the credit card slip comparable to FIG. 9 including the teachings of the present invention. In the credit card slip 1000 of FIG. 10, the cardholder's credit card number, approval number, and expiration date, are omitted from being shown and are replaced with a transaction number 1001, which would in this case be manually entered. The location for the entry of an "id-check no.- lic. no. state" has been intentionally omitted. The inclusion of both a server box 907 and a clerk box 908 may be combined 1002 and are thus shown in FIG. 10.

FIG. 11 is a representation of a deposit charge slip 1100 printed at a CAT station integrated with automated printing means as per the teachings of the present invention. In this example, the deposit slip is printed in a continuous paper, either as a single or multi-part continuous "formset", and includes, together with other conventional information, identification of the nature of the transaction 1101, in this example "Deposit Transaction", deposit number (transaction number) 1102, and a delivery by date 1103. A transaction type 1104, which as indicated previously may be omitted, is illustrated in FIG. 11.

The deposit slips of FIGS. 11, 12, and 13, are examples of the transaction slip 190 utilized in the authorization system detailed previously with respect to FIG. 1. As is illustrated in FIG. 11, for example, in the specific case of a deposit transaction, the transaction number 1102 that is generated by the system and methods detailed with respect to FIGS. 1 and 2, both identifies the deposit transaction and represents an approval number for the transaction.

As indicated previously, each of the deposit slips detailed with respect to FIGS. 11, 12, and 13 provides for the recording of a delivery by date. As is illustrated with respect to FIG. 11, the transaction date, i.e. the date that the deposit is established for the transaction, is, in this example, Jul. 29, 1992. The delivery by date 1103, i.e. the date by which the purchase item or service will be delivered is Aug. 21, 1992. As indicated in the summary of the invention, a deposit transaction is distinguished from a conventional credit card transaction in that a payment is established in advance of the delivery of the merchandise or service.

The deposit slip as per the present invention distinguishes the transaction from a conventional credit card transaction in that it identifies the transaction as a "Deposit Transaction" 1101; establishes a deposit number 1102 both identifying the deposit transaction and representing an approval number; and establishes a delivery by date 1103 for the delivery of the merchandise or service.

As indicated at the outset, the enhanced credit card authorization system as per the present invention and detailed with respect to FIG. 1, comprises a transaction number generator and the storing of the transaction number and transaction information required to complete processing, crediting, and debiting the appropriate accounts. In the case of a deposit transaction, the transaction number generated, if credit authorization is approved for the deposit transaction, is also the deposit number, and the transaction information required to complete the transaction includes the delivery by date. Thus, in the specific case of a deposit transaction, the means (deposit slip) for recording the transaction number at the deposit transaction site also lacks other information regarding the cardholder and does not reveal information which could provide access to credit authorization privileges.

FIG. 12 is a representation of a deposit slip 1200 in a pre-printed multi-part formset analogous to the credit card slip detailed with respect to FIG. 7. Attention is drawn to the transaction identifier 1201, transaction number 1202, a delivery by date 1203, and a acknowledgment statement particular to a deposit transaction 1204.

FIG. 13 is a representation of a deposit slip 1300 in a manual multi-part formset analogous to the credit card slip detailed with respect to FIG. 9. Attention is drawn to the transaction identifier 1301, transaction number 1302, and a delivery by date 1303. In this example the transaction number 1302 may be associated with a check number 1304 rather than a credit charge, and a deposit amount 1305 which may be less than the total amount of goods and/or service purchased 1306.

The above detailed examples of transaction slips are intended to illustrate the invention in a number of different configurations, it is not intended to be an all inclusive presentation of all the available formats which are and may be utilized. Additionally the inventive elements are principally directed at the information provided in a transaction slip in a formset, and apply regardless of the particular formset construction. In this regard, since the transaction number enhancements of the present invention provide the opportunity to limit the amount of information necessary in a transaction slip, the two slips desired in a transaction could be individually printed, avoiding the expense and problems associated with carbon or carbonless duplicating paper. It is also an aspect of the present invention that each of the individually printed transaction slips in a transaction need not be exact duplications of each other.

FIG. 14 illustrates a single ply transaction slip 1400 consisting of two sections, the upper section 1401 being retained by the merchant, and a lower section 1402 being retained by the customer. The upper section 1401 would include information which the merchant may wish to retain in a hard copy format, such as for example: i) seller identification 1411; ii) seller specific transaction information 1412; iii) clerk 1413; iv) date/time 1414; v) transaction type 1415; vi) transaction number 1416; vii) amount 1417; and viii) cardholder's signature 1418. The lower section 1402 would include information which the merchant may wish the customer to retain, such as for example: i) seller complete identification 1421; ii) date/time 1422; iii) transaction type 1423; iv) transaction number 1424; v) amount 1425; and vi) closing message 1426.

Transaction slip 1400 may be obtained from a continuous paper roll, as illustrated in FIG. 14, or may be provided in a precut slip analogous to the formsets illustrated for example in FIGS. 7, 8, and 12. Additionally the upper 1401 and lower sections 1402 may be divided by a dividing means 1403 such as for example a printed line and/or perforation line. The perforation line may be pre-perforated as part of the construction of the transaction slip or continuous roll. Alternatively, the perforation/cutting may be produced interactively by the slip printing device enhanced to include perforating means controlled by the logic of the host device. Additionally, either format may contain logos, information, advertising, coupons, or anything which the merchant may wish to provide therein, either pre-printed or contemporaneously printed.

Referring once more to FIG. 1, and as previously indicated, the transaction record comprising a transaction number need not be produced in a hard format such as a transaction slip, instead or in addition; the cardholder may be provided a soft record of the transaction. Said soft record of the transaction being stored in a credit card provided with read/write memory means, or as may be stored in any other transportable memory device, such as for example a micro floppy disk. In the merchants case, the transaction record may be stored electronically at either the POS/CAT 120 electronic transaction record memory means 125, and/or directly in the merchants database 172. The advantages of said soft record architecture would be eliminating the necessity for a hard copy record, and facilitating the utilization of the transaction record data by the computing means at the cardholder's disposal.

Said transaction record storage memory means need not be limited to a specific technology, such as for example magnetic, electronic, or optical. Any number of data storage architectures may be implemented, such as smart-cards, and laser read/write cards. The information generally contained in the magnetic strip of a credit card could be instead, or in addition, be incorporated in said memory means, and may be placed anywhere in a card, including the card's edges, and may be placed more than once in the same card, such that when a particular data location may fail to convey information, a secondary data location may be utilized. In a laser/optical read/write architecture, the data may be provided in a variety of formats such as for example: linear tracks, or substantially concentric tracks, in such quantities as may be required and accommodated. In this regard the teachings of U.S. Pat. No. 4,868,373, issued to Opheij et al., are by reference incorporated herein.

Figure 15:
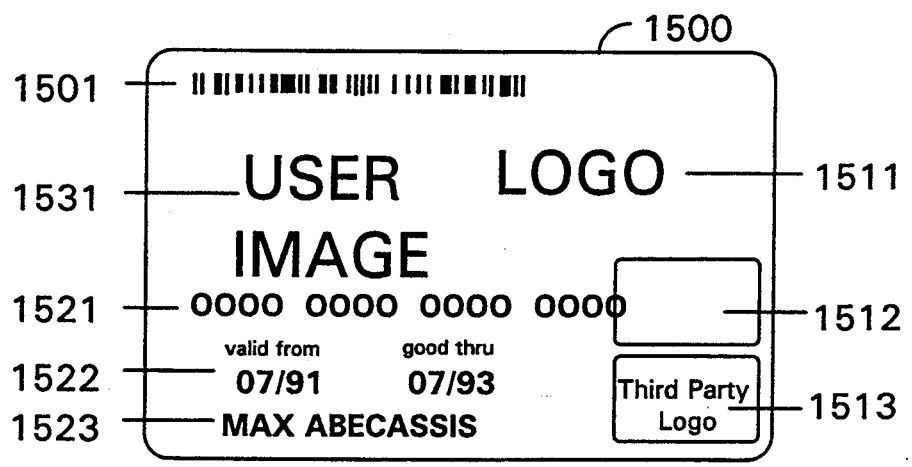
FIG. 15 is a representation of the front of a laser/optical read/write transaction record means as per the present invention.

FIG. 15 is a representation of the front face of an otherwise conventional credit card 1500 further comprising a laser read/write means 1501, represented in the FIGS., for illustrations purposes only, as a barcode design. The card's 1500 conventional elements, which may be incorporated in such combinations as may be required by the various implementations comprise, for example: i) card issuer's logo 1511; ii) holographic image 1512; iii) third party logo 1513, such as for example a "Visa" logo; iv) card number 1521; v) card valid dates 1522; vi) cardholder's name 1523; and vii) cardholder's image 1531. The card number 1521, card valid dates 1522, and cardholder's name 1523, may be embossed as in the prior art, a part of the cardholder's image, or not available to a device unassisted observer. The back face of the card 1500 detailed with respect to FIG. 15, may in all respects be equivalent to a conventional card. Accordingly, it comprises any one or more of the elements of an otherwise conventional card, such as for example: i) card issuer's service number; ii) card issuer's logo; iii) agreement notification; iv) cardholder's signature strip; v) signature designator; vi) magnetic strip; vii) issuer's address; and miscellaneous other symbols and legends may be included.

It is intended that the card detailed with respects to FIG. 15, be the operational equivalent of conventional cards, to facilitate a transition from conventional cards to cards that will abandon a number of elements found in said conventional cards. To that extent the laser/optical card data 1501 is located on the front face of the card 1500 directly opposite the magnetic strip conventionally located in the back face of the card. In this fashion regardless of the credit authorization terminal's (CAT) magnetic and/or laser/optical capabilities the card will always be inserted as per the existing practices. In an alternative embodiment the laser/optical data 1501 may replace and take the place of the magnetic strip, permitting reading of the data from the back of the card.

Figure 16:
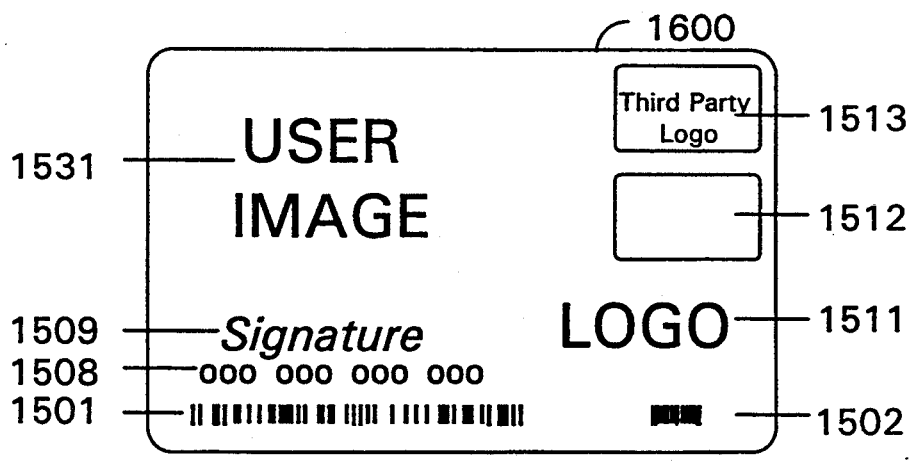
FIG. 16 is a representation of the front of a laser/optical read/write credit card excluding visual card/cardholder identifying information other than cardholder image and cardholder signature as per the present invention.

FIG. 16 illustrates the front face of a credit card 1600, wherein the following are intentionally excluded in any form which may be discernible to a device unassisted observer: i) card number; ii) card valid dates; and iii) cardholder's name. In an environment generally dominated by CAT's that electronically extract the required information from a card, the usefulness of displaying cardholder or card identification information other than an image of the cardholder 1531, and/or the cardholder's signature 1509, may not justify the security risks associated with providing a device unassisted observer access to the card number and valid dates.

It is further preferred and intended that the card number is also not otherwise provided to the valid cardholder, and is also intended that the card number be valid only when automatically retrieved by the CAT directly from the card. The cardholder is provided an account number 1508, distinguishable from card numbers, which would serve informational functions, such as for example, account inquiries, and phone/mail transactions. In instances where the card fails to disclose the card number to the CAT, the account number may be temporarily utilized in conjunction with positive identification such as the entry of a PIN and/or a driver's license. Transactions conducted by means of the account number would serve, by means of computer analysis, to efficiently and promptly identify and commit resources to address deficiencies in cards (overnight replacement of the card), devices, operation, and/or to alert to the existence of potential fraudulent conditions. The separate account number 1508 may be provided in the card 1600, in a separate card, or not provided at all, in which case entry by the cardholder of for example the cardholder's social security number in combination with a PIN would suffice.

Figure 17:
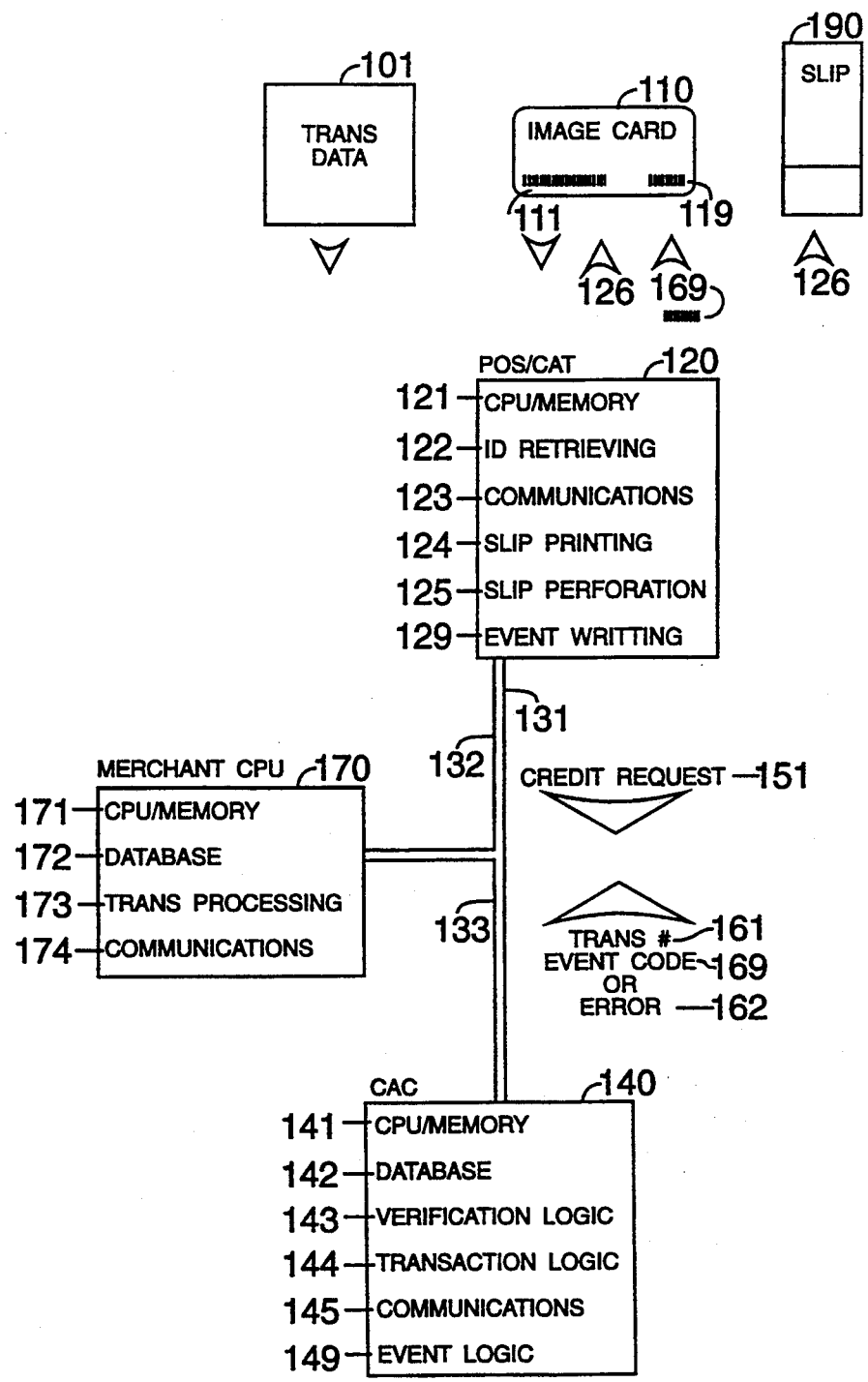
FIG. 17 is a block diagram of the credit authorization system detailed with respect to FIG. 1 further enhanced to incorporate the last event code architecture as per the present invention.

In a preferred embodiment of the present credit authorization system, the credit card's externally accessible read/write nonvolatile memory means would additionally or separately record and store a last event code 1502 such that the effective card identifier comprises the card number 1501 and said last event code 1502. FIG. 17 is a block diagram of the credit authorization system detailed with respect to FIG. 1 further comprising said event code architecture. The significant additional elements comprising: last event code memory means in the credit card 119, event code read/write means in the CAT 129, and event logic means in the CAC 149. When the credit card 110 is read by the CAT 120 ID retrieval means 122, in addition to the retrieval of a card number 111, the CAT retrieves said last event code 119. This and other information comprising a credit authorization request 151 is transmitted as previously detailed. If the transaction is in all respects acceptable, as previously detailed, the CAC 140 event logic routines 149 retrieves from the customer record the last event code, if this is found to match the event code retrieved from the card, the transaction is found acceptable. In addition to obtaining a next transaction number 161, the event logic generates a new event code which is written in the customer record, and is transmitted to the CAT. The CAT 120 overwrite the previous last event code 119 in the credit card's memory means, with the new event code 169, ensuring that the data contained in the credit card and the corresponding data in the CAC database 142 remain synchronized. If in any respects the transaction is not found acceptable, then an appropriate negative response 162 is transmitted by the CAC 140 to the CAT 120, and no changes to the last event code 119 are affected.

It should be understood that the last/new event code need not comprise any particular complex or contrived code, the presence or absence of a single bit may be sufficient, providing a fraudulent user a one in two chance of being detected, and facilitating a number of different implementations some of which are detailed further below. A first implementation may comprise the electronic read/write means and nonvolatile memory. In such a card the event code is transmitted though an electrical contact established with the CAT, when the card is inserted in the CAT. Alternatively, said event code implementations, may compose magnetic means. To prevent the read/write of said verification code corrupting the card number, in instances, where the card number is magnetically recorder in a magnetic strip provided in the card, storing of said card number is in a significantly higher coercive force magnetic oxide layer, or section, that the layer or section storing the event code. In this respect, the teachings of U.S. Pat. No. 4,544,184, issued to Freund et al., are noted and by reference incorporated herein. The terminal writing to the magnetic strip would operate in a lower magnetic field. Alternatively, the event code may be written to a different one of the three tracks containing a card number, or a supplementary track may be added for said code.

In another alternative implementation, a card may incorporate an embedded coded surface acoustical wave (SAW) transponder device connected to a coupling coil or antenna forming a continuous loop. Said SAW implementation is analogous to the teachings of U.S. Pat. No. 4,980,680, issued to Knoll et al. which together with the prior art cited therein is by reference incorporated herein. The SAW device may store and provide card identification information and/or the last event code. In this example the CAT would be appropriately equipped to interact with the SAW provided card.

A number of memory means that may first outwardly read and subsequently change information in a credit card may be instead be implemented such as, for example those detailed in the teachings of U.S. Pat. No. 5,130,519, issued to Bush et al., specifically the teachings with respect to communication via induction, optoelectric communication, communication by a Hall Effect Device, power transfer by induction, communication via a pin connector, power transfer via a pin connector, are by reference incorporated herein. Additionally, in view of the laser and/or optical elements present in certain preferred embodiments, writing of a last event code may incorporate laser and/or cathode ray tube means.

Since the prior art is well established, and many of the features, components, and methods, found therein may be incorporated, as suggested above, in the preferred embodiment; and since other modifications and changes varied to fit particular operating requirements and environments will be apparent to those skilled in the art, the invention is not limited to the presently preferred form of the present invention set forth here and above, it is to be understood that the invention is not limited thereby. It is also to be understood that the specific details shown are merely illustrative and that the invention may be carried out in other ways without departing from the spirit and scope of the following claims.

What is claimed is:

1. A deposit authorization system for a deposit transaction comprising:
   identification means for providing identification information;
   input/output device provided local to the deposit transaction;
   transmission means in communication with said input/output device for transmitting said identification information as well as transaction information relating to the deposit transaction;
   processing means provided at a remote location from the deposit transaction and connected to said transmission means for processing said identification information and said transaction information, said processing means further comprising approval means for determining approval for the deposit transaction, said processing means further comprising means for generating a transaction number if approval of the deposit transaction is determined, said transaction number both identifying the deposit transaction and representing an approval number, said transaction number being stored in a memory means in communication with said processing means and being communicated to said transmission means and said input/output device; and
   record means for recording said transaction number at the deposit transaction site, said record means lacking any information thereon relating to said identification information.

2. The system of claim 1, wherein said identification means further provides a means for verifying card information included in said identification means which is transmitted by said transmission means from said input/output device to said processing means, said processing means employing said means for verifying information for determining approval of the deposit transaction, said processing means further comprising means for updating card information if the deposit transaction is approved, the updated card information stored in said memory means and transmitted to, and stored in said identification means.

3. The system of claim 1, wherein said record means is a purchase deposit slip and said transaction number is provided on said purchase deposit slip.

4. The system of claim 1, wherein said transaction number is recorded in said identification means.

5. The system of claim 1, wherein said transaction information further comprises a delivery by date for a purchase in said deposit transaction recorded in said record means.

6. The system of claim 1, wherein said record means further includes a deposit transaction identifier.

7. The system of claim 1, wherein said approval means is responsive to a payment by check of the deposit transaction and wherein said record means records said payment by check.

8. A deposit authorization system for a deposit transaction comprising:
   identification means for providing identification information;
   input/output device provided local to the deposit transaction;
   transmission means in communication with said input/output device for transmitting said identification information as well as transaction information relating to the deposit transaction, said transaction information comprising a delivery by date for a purchase in the deposit transaction;
   processing means provided at a remote location from the deposit transaction and connected to said transmission means for processing said identification information and said transaction information, said processing means further comprising approval means for determining approval for the deposit transaction, said processing means further comprising means for generating a transaction number if approval is determined, said transaction number being stored in a memory means and being communicated to said transmission means and said input/output device; and
   record means for recording said transaction number and said delivery by date at the deposit transaction site, said record means lacking any information thereon relating to said identification information.

9. The system of claim 8, wherein said identification means further provides a means for verifying card information included in said identification means which is transmitted by said transmission means from said input/output device to said processing means, said processing means employing said means for verifying information for determining approval of the deposit transaction, said processing means further comprising means for updating card information if the deposit transaction is approved, the updated card information stored in said memory means and transmitted to, and stored in said identification means.

10. The system of claim 8, wherein said record means is a purchase deposit slip and said transaction number is provided on said purchase deposit slip.

11. The system of claim 8, wherein said transaction number is recorded in said identification means.

12. The system of claim 8, wherein said record means further comprises a deposit transaction identifier.

13. The system of claim 8, wherein said transaction number both identifies the deposit transaction and represents an approval number.

14. The system of claim 8, wherein said approval means is responsive to a payment by check of the deposit transaction and wherein said record means records said payment by check.

15. A deposit authorization system for a deposit transaction comprising:
   identification means for providing identification information;
   input/out device provided local to the deposit transaction;
   transmission means in communication with said input/output device for transmitting said identification information as well as transaction information relating to the deposit transaction, said transaction information comprising a delivery by date for a purchase in the deposit transaction;
   processing means provided at a remote location from the deposit transaction and connected to said transmission means for processing said identification information and said transaction information, said processing means further comprising approval means for determining approval for the deposit transaction, said processing means further comprising means for generating a transaction number if approval is determined, said transaction number being stored in a memory means and being communicated to said transmission means and said input/output device; and purchase deposit slip means for recording said transaction number and said delivery by date, at the deposit transaction site, said purchase deposit slip means lacking any information thereon relating to said identification information.

16. The system of claim 15, wherein said identification means further provides a means for verifying card information included in said identification means which is transmitted by said transmission means from said input/output device to said processing means, said processing means employing said means for verifying information for determining approval of the deposit transaction, said processing means further comprising means for updating card information if the deposit transaction is approved, the updated card information stored in said memory means and transmitted to, and stored in said identification means.

17. The system of claim 15, wherein said purchase deposit slip means further comprises a deposit transaction identifier.

18. The system of claim 15, wherein said transaction number both identifies the deposit transaction and represents an approval number.

19. The system of claim 15, wherein said approval means is responsive to a payment by check of the deposit transaction and wherein said record means records said payment by check.

20. A deposit authorization system for a deposit transaction comprising:

identification means for providing identification information;

input/output device provided local to the deposit transaction;

transmission means in communication with said input/output device for transmitting said identification information as well as transaction information relating to the deposit transaction, said transaction information comprising a delivery by date for a purchase in the deposit transaction;

processing means provided at a remote location from the deposit transaction and connected to said transmission means for processing said identification information and said transaction information, said processing means further comprising approval means for determining approval for the deposit transaction, said processing means further comprising means for generating a transaction number if approval is determined, said transaction number both identifying the deposit and representing an approval number, said transaction number being stored in a memory means and being communicated to said transmission means and said input/output device; and purchase deposit slip means for recording said transaction number and said delivery by date, at the deposit transaction site.

21. The system of claim 20, wherein said input/output device provided local to the deposit transaction comprises a telephone.

* * * * *